(12) United States Patent
Long, Jr. et al.

(10) Patent No.: US 8,696,473 B2
(45) Date of Patent: Apr. 15, 2014

(54) AUTOMATIC RESETTING TORQUE LIMITER CAPABLE OF HIGH SPEED CONTINUOUS OPERATIONS IN RELEASED MODE

(75) Inventors: Thomas F. Long, Jr., Wichita Falls, TX (US); Mark Wayne Rudolph, Wichita Falls, TX (US)

(73) Assignee: Brunel Corporation, Wichita Falls, TX (US)

( * ) Notice: Subject to any disclaimer, the term of this patent is extended or adjusted under 35 U.S.C. 154(b) by 0 days.

(21) Appl. No.: 13/531,633

(22) Filed: Jun. 25, 2012

(65) Prior Publication Data
US 2013/0157768 A1    Jun. 20, 2013

Related U.S. Application Data

(63) Continuation-in-part of application No. 12/481,701, filed on Jun. 20, 2009, now abandoned.

(60) Provisional application No. 61/060,288, filed on Jun. 10, 2008.

(51) Int. Cl.
*F16D 7/04* (2006.01)
(52) U.S. Cl.
USPC ............................................................. 464/37

(58) Field of Classification Search
USPC ....................................................... 464/37, 38
See application file for complete search history.

(56) References Cited

U.S. PATENT DOCUMENTS

| 2,501,648 A | 3/1950 | Ogden |
| 2009/0305794 A1 | 12/2009 | Long, Jr. et al. |

FOREIGN PATENT DOCUMENTS

| GB | 2 265 191 A | * | 9/1993 | ...................... 464/37 |

* cited by examiner

*Primary Examiner* — Gregory Binda
(74) *Attorney, Agent, or Firm* — John R. Benefiel

(57) ABSTRACT

A resettable torque limiter for installation between two rotary members, which can smoothly disengage upon application of predetermined torque acting between the members and smoothly reset upon decline of applied torque below the predetermined level. An undulating engagement surface formed on one member according to a function preferably an eighth power polynomial is engaged by a plurality of engagement elements on the other member which smoothly ride over lobes formed on the engagement surface when the torque limit is exceeded without causing any discontinuities in acceleration or jerk when the driving connection between the rotary members is interrupted until the applied torque declines below the preset limit.

7 Claims, 10 Drawing Sheets

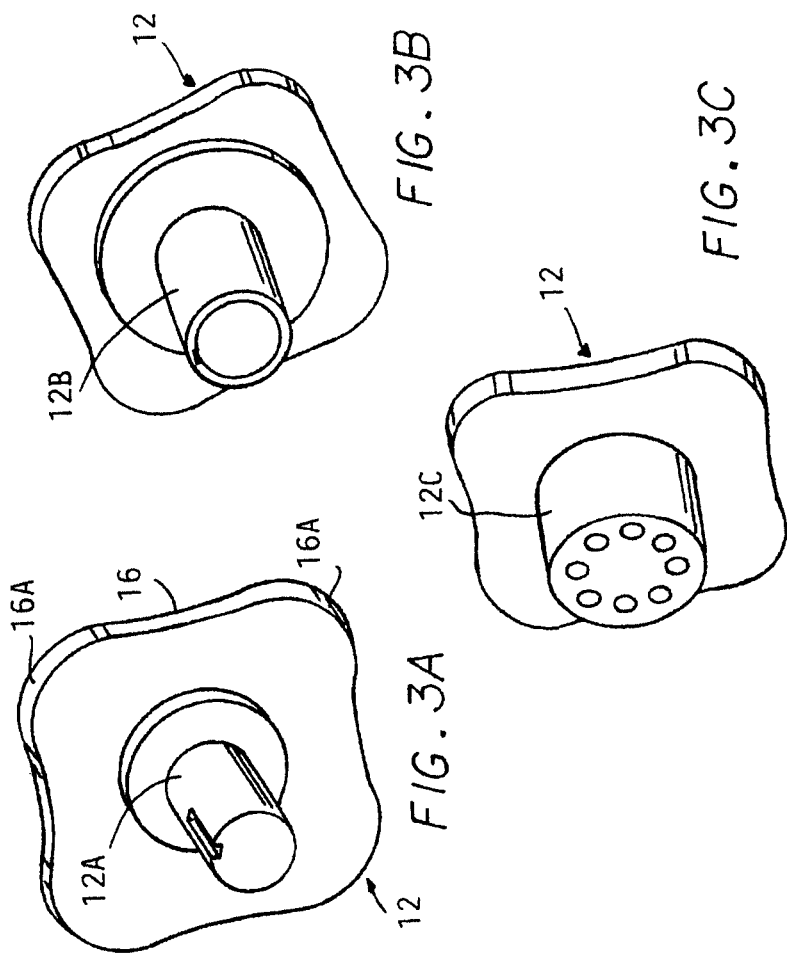

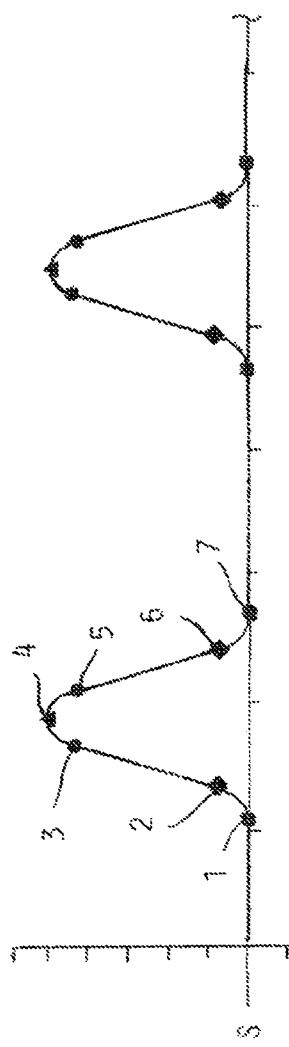
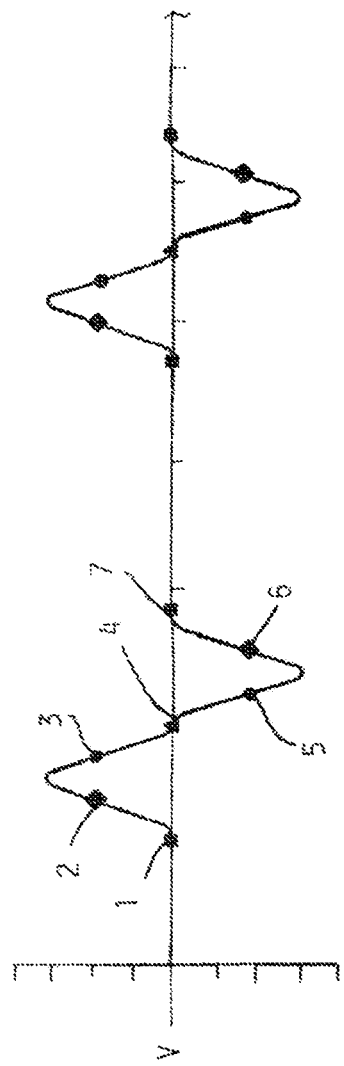

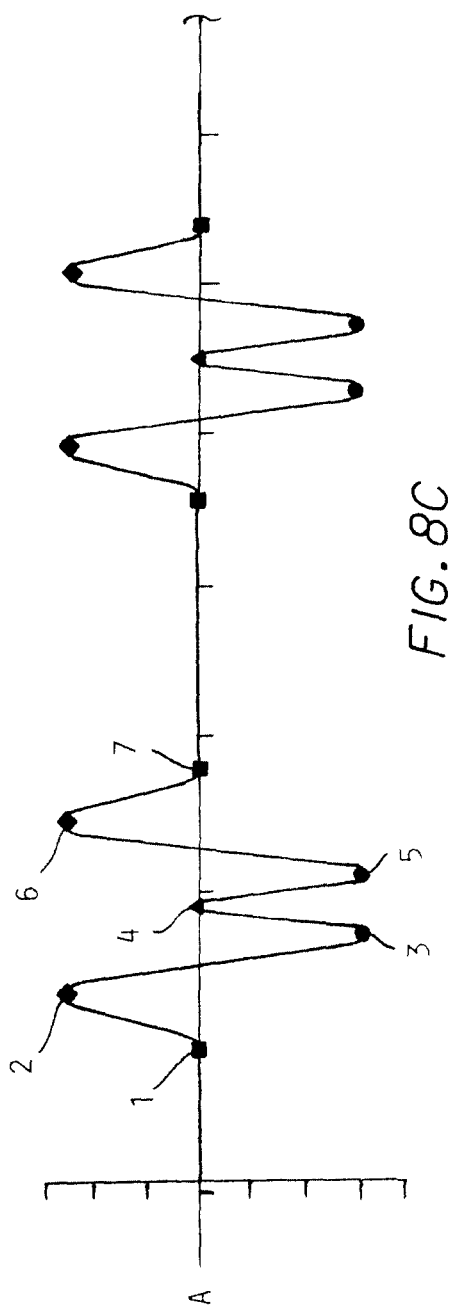
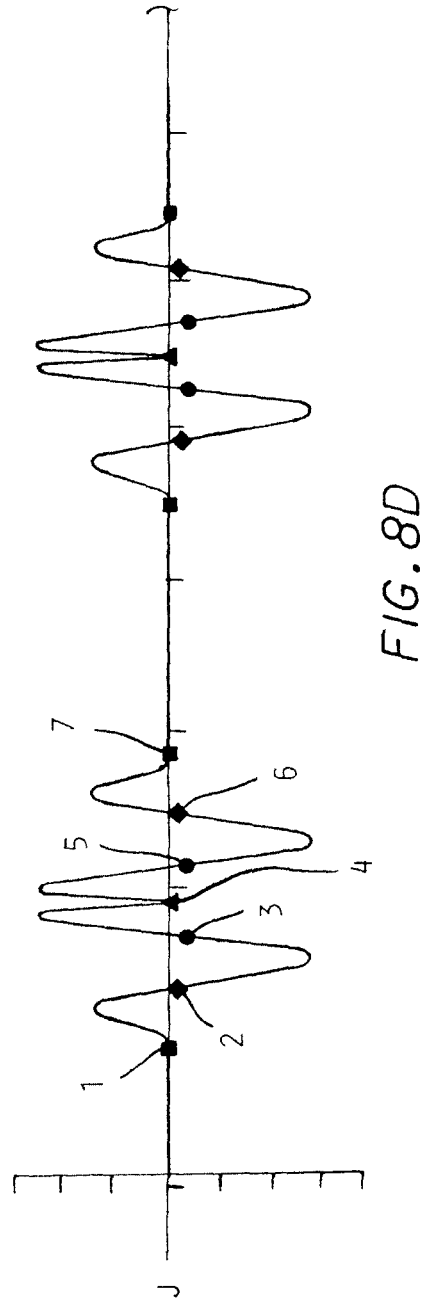
FIG.8C
FIG.8D

AUTOMATIC RESETTING TORQUE LIMITER CAPABLE OF HIGH SPEED CONTINUOUS OPERATIONS IN RELEASED MODE

CROSS REFERENCE TO RELATED APPLICATIONS

This application is a continuation in part of U.S. patent application Ser. No. 12/481,701 filed on Jun. 20, 2009 now abandoned, which claims the benefit of U.S. provisional application No. 61/060,288 filed on Jun. 10, 2008, the corresponding published application no. 2009-0305794-A1 is incorporated herein by reference.

BACKGROUND OF THE INVENTION

This invention concerns automatically resetting torque limiting clutches, commonly referred to as limiters and more particularly automatically resetting torque limiters which can disconnect drive on overload.

Torque limiters are designed to release a driving connection when an excessive load is experienced. Such limiters are typically used in the context of a drive for various types of machinery subject to jams and other overloads in order to not damage the driving motor or the machinery. In most instances, the release of the torque limiter is noticed soon after it occurs since the machinery ceases to operate, and the need to reset the torque limiter input becomes apparent.

Automatic resetting torque limiting clutches have been in existence for many years, typically of a friction clutch or ball detent type. The friction type will release or slip at a preset overload torque value, and will reengage when the overload is removed. The disadvantage of this arrangement is that repeated heating of the torque limiter friction linings (as heat is generated by the slipping) causes the clutch capacity to fade, as the higher lining temperatures reduces the coefficient of friction, until the torque limiter slips continuously and destroys itself.

Another long known torque limiter type is the ball-detent reset torque limiter, which uses spring forces to push balls into drill point cavities in the other member, with the geometry thereof establishing forces and angles to produce a retraction of said balls to create a release at a preset torque level. The torque limiter will reengage when the torque demand falls somewhere below the release torque. The disadvantage of this device is the sudden changes in the acceleration of the connected components, which produces stresses in the material which exceeds the elastic limits of the components when running, disengaged, or when reengaging, which in turn produces deformations which greatly reduce the torque limiter service life.

There have also been developed further refinement of such torque limiters in which smoothly curved engagement surfaces define the cavities in an attempt to reduce the stresses occasioned by engagement and reengagement.

In some torque limiter installations, relatively high speeds of the input is involved, commonly as high as motor speed, when there is no reduction gearing interposed between the motor and the input to the torque limiter lowering the rotational speed of the input. In those instances of high speed torque limiter release, the overrunning components would be subjected to severe shock loads as a result of being driven at these high rotational speeds, which can be of the order of 1800 rpm or greater.

This could cause deformation of the mating torque limiter components, leading to failure or to changes in the set and reset torque levels due to deformations of the follower elements or engagement surfaces.

These applications create severe demands in cases where access to the torque limiters is very difficult or impossible as when the machine is located in tight spaces such as in tunneling and mining operations. In these applications, a torque limiter will likely be operated in the disengaged mode for extended time periods, and complete failures or significant degrading of performance would be very undesirable and costly.

A satisfactory torque limiter for such high speed limited access applications has not yet been developed.

Those working in the torque limiter field and on resettable torque limiters of the type described have heretofore long recognized that the drive surfaces which act to interrupt the drive through the limiter by causing drive elements under excessively high loads to be moved to a released position should be smoothly curved to reduce shocks when engaging and disengaging these elements. See U.S. Pat. No. 2,501,648 for a discussion of these matters in the context of an automatically resetting torque limiter.

In the field of cams design in a machine where there is a particular designed for output motion there has long been recognition that simply smoothly curving these surfaces is not sufficient to avoid shocks and early failures.

However, in the field of automatic resetting torque limiters, it has not heretofore been recognized that simply smoothly curving the engagement surfaces which are engaged by drive elements is not sufficient to eliminate noise and impact wear of the engagement surfaces and elements when continuously operating in the released condition at high speeds, i.e. around 1800 rpm or higher. In fact, despite a long felt need for such a torque limiter, no automatically reset torque limiter has been produced which can operate successfully under those conditions.

It is the object of the present invention to provide an automatically resettable torque limiter which is capable of operating in its released mode at high speeds for extended periods without damaging the mechanism such as to result in a failure or in a progressive change in the release and resetting torque levels.

It is a further object to provide such an automatically resetting torque limiter which is not excessively noisy when running in its released condition at high speeds.

SUMMARY OF THE INVENTION

The above recited objects and other objects which will be understood upon a reading of the following specification and claims are achieved by providing a particular engagement surface curved shape which does not create large dynamic loads or stresses in the components which exceed the elastic limit of the elements even when operated at high speeds of 1800 rpm or greater such as to minimize shocks and resultant wear and noise during operation.

Such engagement surface curve is of a shape which does not produce discontinuities in the acceleration and jerk functions of the follow elements induced therefrom at any point during overrunning operation. Such engagement surface curve shape is preferably defined by a polynomial of at least fifth power and preferably a seventh power and most preferably an eighth power polynomial with other parameters producing the desired torque drive release value and designed for the particular installation of the resettable torque limiter.

DESCRIPTION OF THE DRAWINGS

FIG. 3A is a pictorial view of the rotary member included in the torque limiter of FIG. 1.

FIG. 3B is a pictorial of a different embodiment of the rotary member shown in FIG. 3A.

FIG. 3C is a pictorial view of another embodiment of the rotary member shown in FIG. 3A.

FIGS. 8A, 8B, 8C and 8D are plots of the displacement, velocity, acceleration and jerk of engagement elements produced by an eighth power polynomial defined engagement surface when the torque limiter engagement elements are traversed over the engagement surface.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
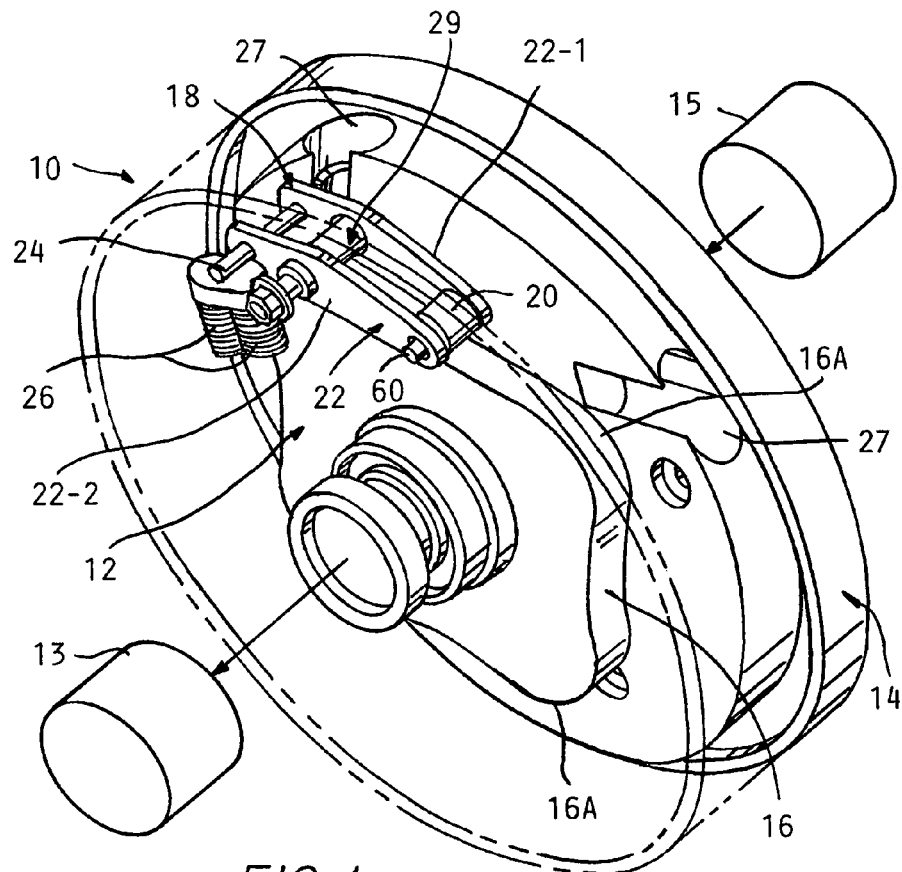
FIG. 1 is a pictorial view of a torque limiter according to the present invention with an outer rotary member shown in phantom lines to reveal interior details.

A torque limiter 10 which is automatically resettable is shown in FIG. 1.

The automatically resetting torque limiter 10 includes two relatively rotatable rotary members 12, 14. One of the members shown as 14 in FIG. 1, is drivingly connected to a source of power 15 such as an electric motor, the other of the members shown as 12 in FIG. 1, is drivingly connected to driven machinery 13. One member 12 is formed with an engagement surface 16, which extends circumferentially about the axis of rotation of the member 12. The engagement surface 16 in this embodiment undulates to form one or more peak undulations or lobes 16A, the distance from the axis of rotation to points on the engagement surface 16 varying about the outer perimeter of the member 12 in the region of the lobes 16A.

The other rotary member 14 mounts one or more engagement elements, here comprised of rocker arm roller follower assemblies 18 including rolling engagement elements comprising rollers 20 spring urged into engagement with the engagement surface 16 with a radially inwardly directed force which increases as the engagement elements or rollers 20 move up a lobe 16A.

Rocker arm mounted follower rollers 20 are preferred over slidable contact elements such as shown in U.S. Pat. No. 2,501,648 as the rollers and the rocker arm mount therefore minimizes sliding contact and thereby reduces friction and the resultant heat buildup therefrom as the limiter continuously operates in a released mode for sustained periods.

As long as the torque level transmitted between the members 12, 14 is below a predetermined release torque, the spring force prevents the engagement rollers 20 from completely ascending the peaks defining undulations or lobes 16A since the spring force resisting movement of the rollers increases as the engagement rollers 20 move out radially in moving up the lobes 16A until the applied torque can no longer generate sufficient force to further displace the engagement rollers 20, and relative rotation is prevented so that the driving relationship between the members is maintained.

The rotary driving connection is between the engagement surface 16 and the engagement elements comprise of the roller assemblies 18, and there is thus only slight relative rotation therebetween as the rollers 20 partially ascend the lobes and the driving relationship between members 12 and 14 is maintained. The radially directed spring force will prevent movement of the engagement rollers 20 all the way up the lobe 16A, due to the increasing resistance preventing relative rotation until the torque reaches the preset torque limit.

The reaction force between the engagement rollers 20 and the engagement surface 16 produces a tangential component capable of transmitting a torque as long as the members 12, 14 do not rotate relative to each other. This relative rotation is prevented as long as the torque level generates a radial or axial component not sufficiently high to be able to move the follower elements 20 completely past the peak undulations or lobes 16A. That is, the torque must be high enough to develop a force component able to overcome the increasing force generated by the springs and force the engagement rollers 20 to move a sufficient radial distance in a direction away from the engagement surface 16 to clear the lobes 16A against the resistance of the component of the reaction to spring force acting on the engagement rollers 20 in opposition to the applied torque.

Once that preset torque limit is exceeded, the engagement rollers 20 will overcome the spring force and completely ascend and move past the respective lobes 16A of the engagement surface 16, and relative rotation between the members 12, 14 will commence and continue as long as the applied torque remains at or above that level. If the torque level declines below that predetermined level, drive is automatically re-established between the members 12, 14 as the engagement rollers 20 can no longer completely ascend the lobes 16A due to the resistance created by the spring forces.

The moving parts may be submerged in an oil bath, the oil held outward by centrifugal force, and heat from churning the oil when the torque limiter 10 is continuously running in a released mode is thereby dissipated to the air.

The rocker arm-roller assemblies 18 and lobes 16A may be variously configured and mounted as described in the published patent application no. 2009-0305794 A1.

The engagement surface 16 can be varied to accommodate additional roller assemblies as required to produce the required release torque level, with one lobe for each roller assembly 18. The engagement surface shape can also be varied to produce high torque attack, i.e., resistance to radial or axial movement of the follower rollers 20 can be made to increase rapidly when ascending the lobes 16A and a lower rate of torque decline when descending past the lobes 16A.

The engagement surface 16 can also be on the exterior perimeter of the rotary drive member 12 with the engagement element rollers 20 moving radially outwardly against inwardly directed spring forces to release as shown in FIG. 1, or a surface can be formed on an internal surface, with the rollers 20 spring urged to move radially outwardly as described in U.S. 2009-0305794 A1.

The engagement surface can also be formed on an axial face of a drive member with the rollers 20 moved axially as described in U.S. 2009-0305794 A1.

Figure 2:
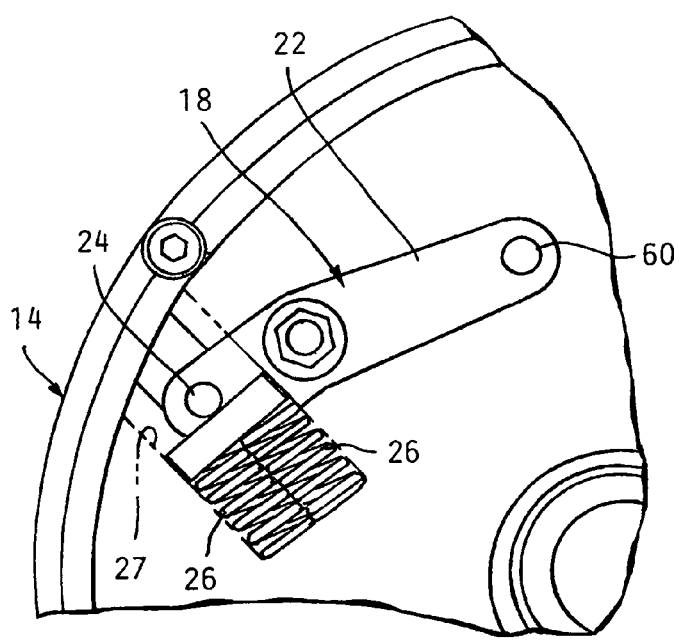
FIG. 2 is an enlarged fragmentary side view of a portion of the torque limiter shown in FIG. 1.

In the torque limiter 10 shown in FIGS. 1-3, one rotary drive member 12 comprises a rotor having a peripherally extending external engagement surface 16 as described above, and the rocker arm-roller assemblies 18 each include an engagement element comprised of a roller 20 mounted on one end of a rocker arm 22 formed by a pair of rocker arm plates 22-1, 22-2 pivotally mounted on the other rotary driven member 14 with pivot pin assemblies 29.

The other rotary member 14 is formed in an annular shape which encloses the rotary member 12. The other end of each of the pivoted rocker arms 22 mounts a cross pin 24 which acts to compress a pair of springs 26 disposed in spring seat cavities 27 formed in the member 14. The rocker arms 22 pivot up as the engagement rollers 20 are moved radially outwardly in ascending the lobes 16A but are unable to completely pass over the lobes 16A until the transmitted torque exceeds a predetermined level. Other arrangements are possible as described in published patent application U.S. No. 2009-0305794 A1.

As described above, the displacement of the engagement rollers produced by the curve of the engagement surface 16 must produce smooth accelerations of the rollers 20 when ascending the lobes 16A, in order to avoid shocks when the torque limiter 10 is running released or when resetting.

Figure 4A:
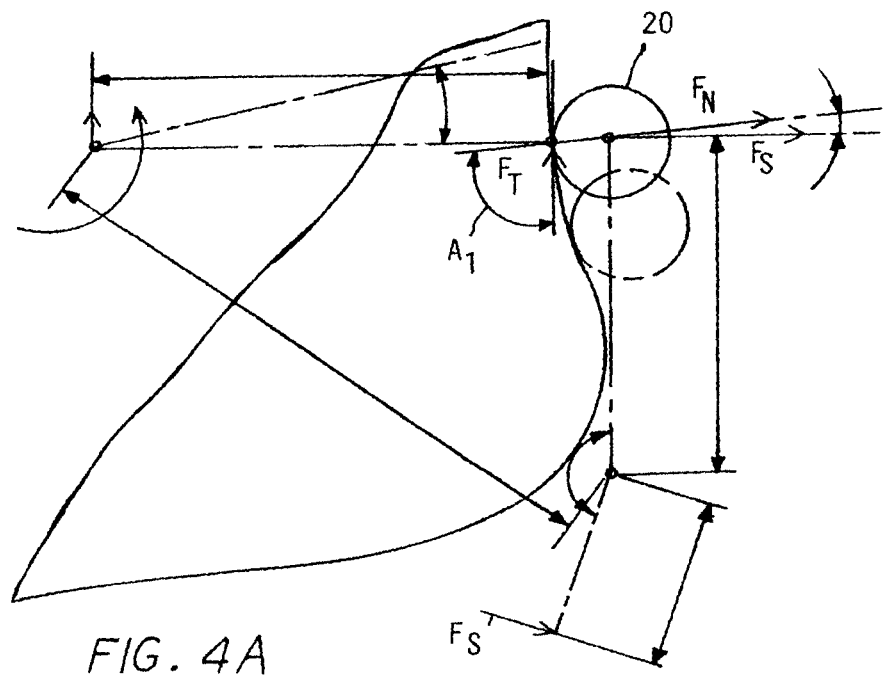
FIGS. 4A and 4B are diagrams of the force relationship between an external engagement surface and follower roller follower in normal operation in the released condition.
Figure 4B:
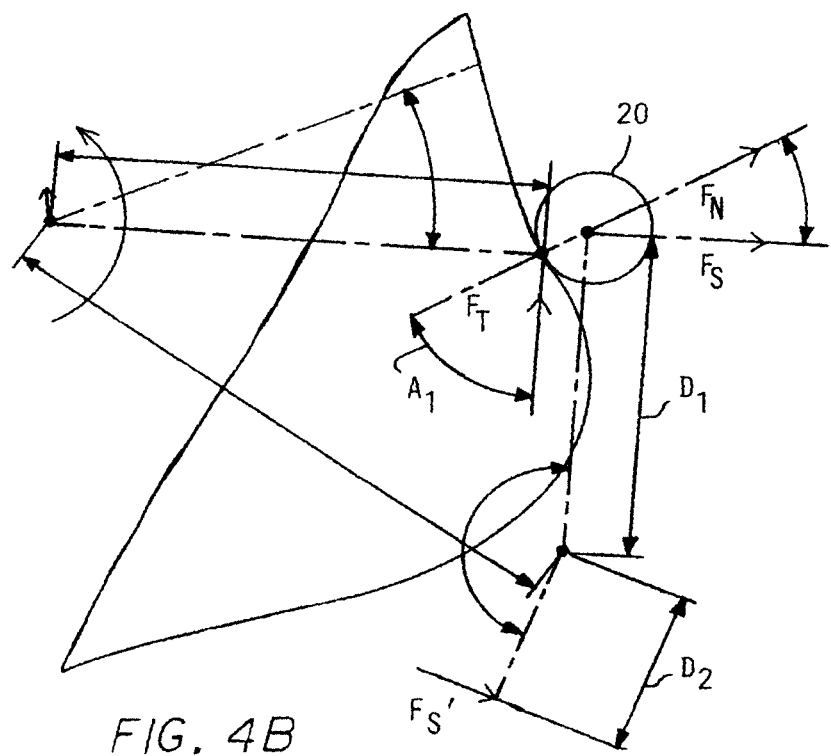

FIGS. 4A and 4B plot the forces generated in a driving condition transmitting torque below the preset limit (FIG. 4A) and high torque exceeding the preset limit (FIG. 4B). As torque is applied to the member 12, each engagement roller element begins to roll up a lobe 16A, increasingly compressing the spring through the rocker arm 22. The force of the spring ($F_S$) keeping the engagement element roller 20 in constant contact with the engagement surface 16 (through the rocker arm) causes a reaction force ($F_N$) normal to the cam surface. A component of ($F_N$) acting perpendicular to a radial line to the point of contact is shown as ($F_T$). The magnitude of ($F_T$) multiplied by the radial distance to the point of contact is the torque transmitted by the follower. The magnitude of ($F_T$) increases as the follower rollers rolls further up the lobes 16A due to the increased spring compression combined with the increased pressure angle between ($F_N$) and the radial line to the point of contact. As the magnitude of ($F_T$) increases and the radial distance between ($F_T$) and the axis of rotation increases, the transmitted torque increases until it equals the input torque. When a torque overload situation occurs and the engagement roller 20 rolls up and over the lobe 16A, the torque transmitted drops until the engagement element encounters the next lobe 16A on the engagement surface 16 in a continuously repeating cycle.

Figure 6:
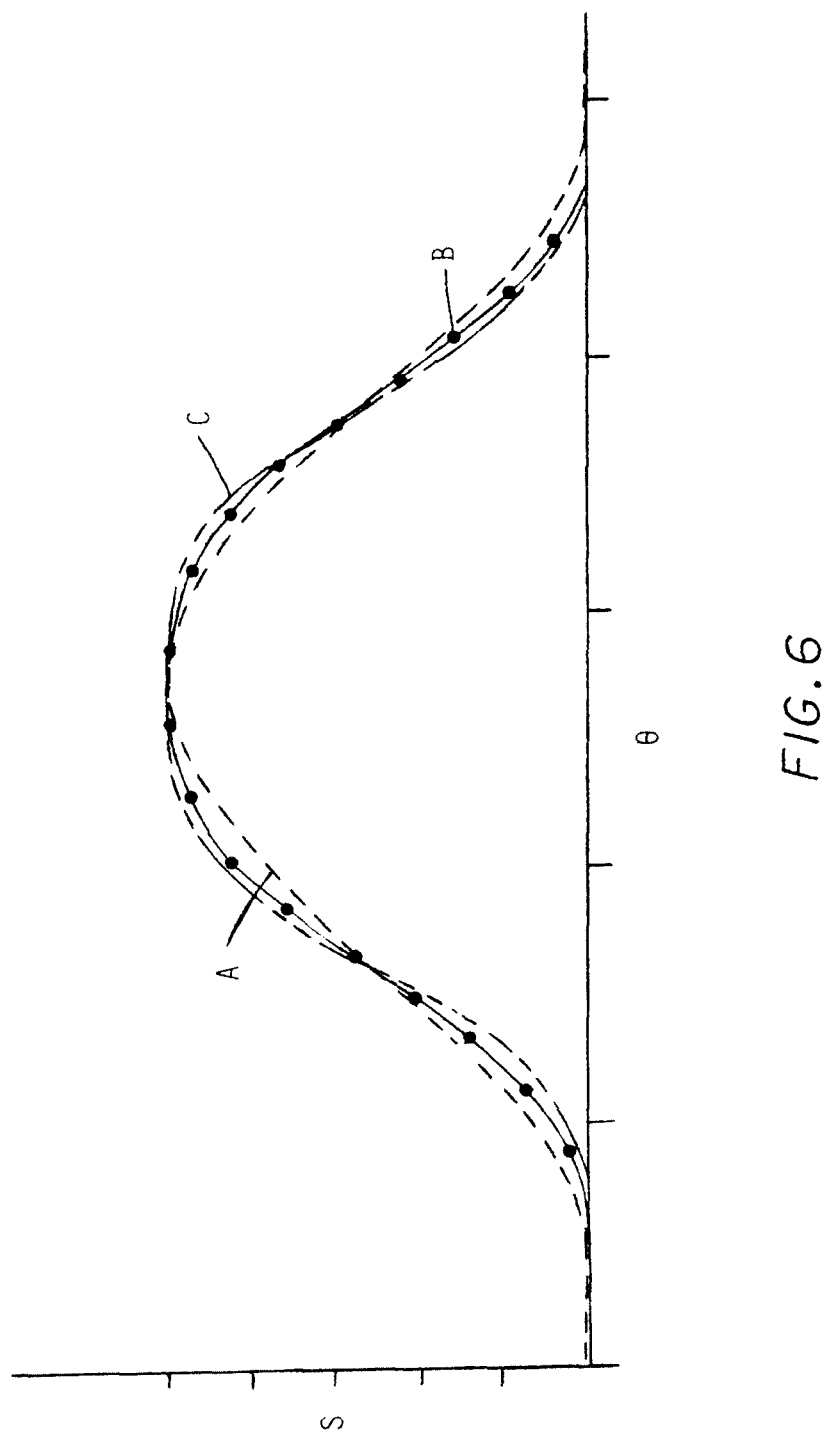
FIG. 6 is a plot of the shape of each of three forms of an engagement surface.

FIG. 6 shows a plot of three typical smooth overlapping curves, displacement versus rotational angle, a simple harmonic curve A (broken line), a cycloidal curve B (solid line), and a seventh power polynomial curve C (partially broken line).

Figure 7A:
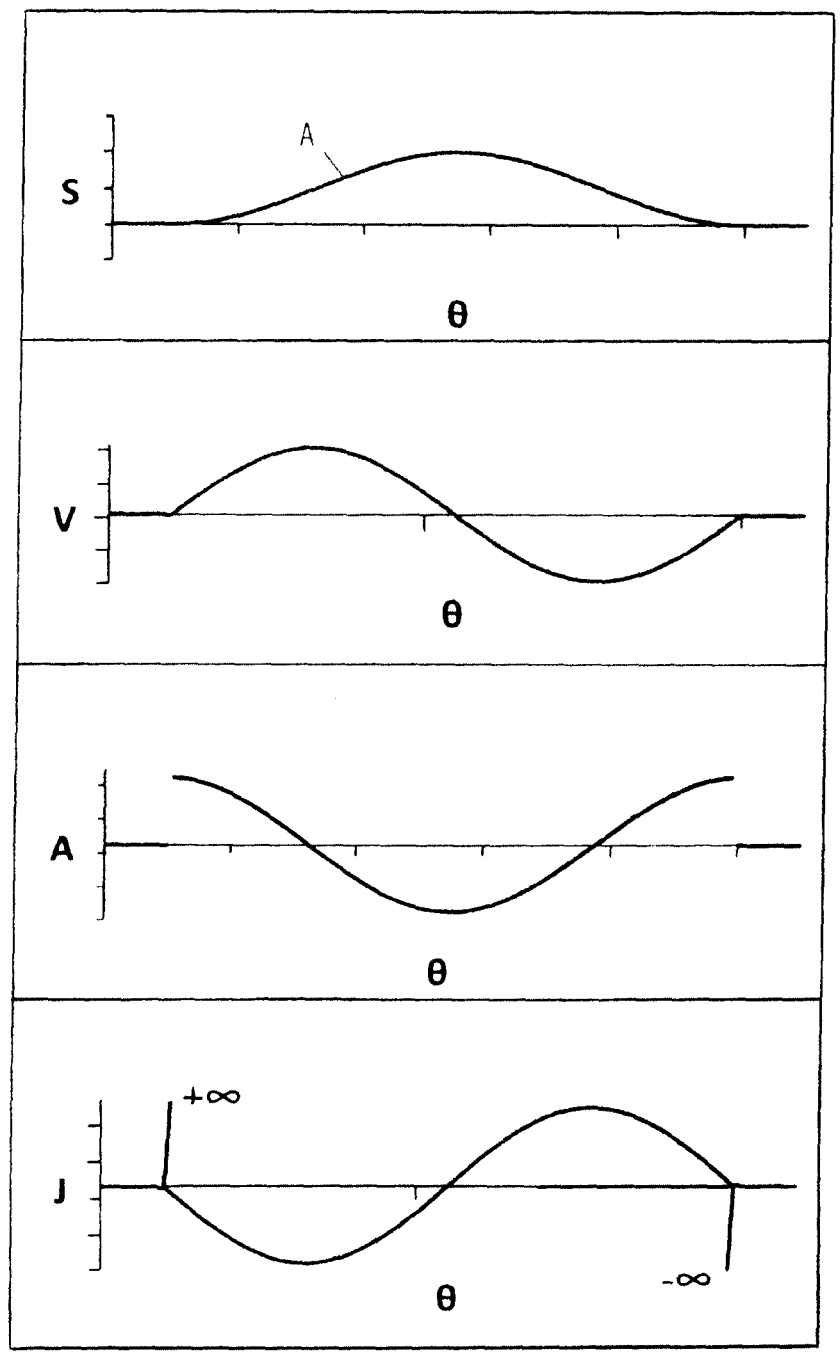
FIGS. 7A-7C are respective plots of displacement, velocity, accelerations, and jerk produced by the three engagement surface shapes shown in FIG. 6.

It should be noted that these are all smooth curves. However, FIG. 7A which shows plot of the first three derivatives of displacement for the simple harmonic function corresponding to the curve reveals that the plots of acceleration A and jerk J evidence discontinuities which theoretically represent infinite values of acceleration. Corresponding accelerations and jerk would impose destructive loadings and excessive noise, and leading to progressively variable performance and perhaps early failure of a torque limiter using such a shape for an engagement surface. This is despite the gradual appearance of the gentle curved shape of an engagement surface according to a simple harmonic function.

Figure 7B:
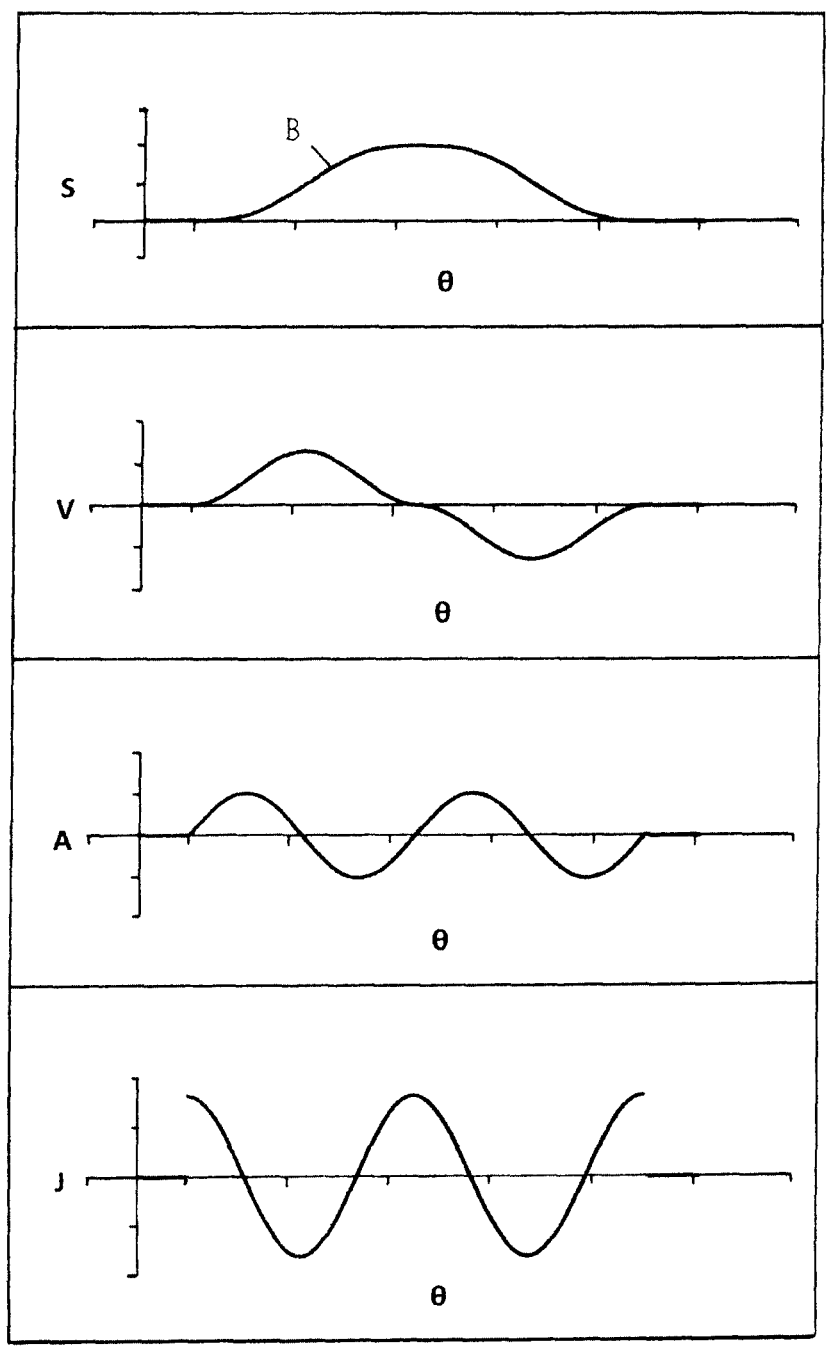

FIG. 7B shows plots of the three derivatives of the cycloidal function plot, revealing such discontinuities in the jerk plot, which have it also been determined to create unacceptable loadings and noise.

Figure 7C:
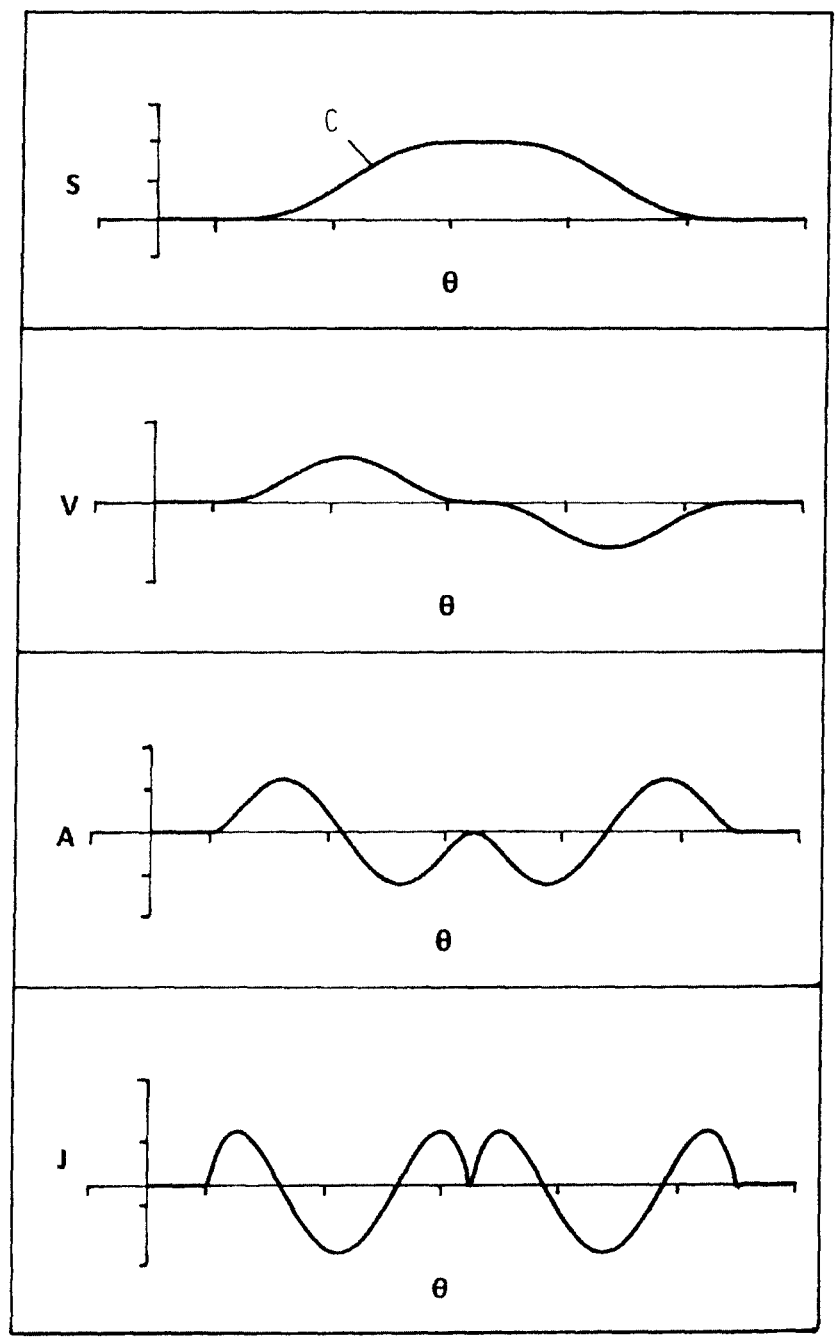

FIG. 7C shows the plots of the derivatives of seventh power polynomial, revealing that no such discontinuities occur, and this shape would allow a torque limiter to operate continuously in a released mode at relatively high speed, i.e., on the order of 1500-1800 rpm, without damage or changing release and reset torque levels.

FIG. 8A is a plot of displacement versus angular position, according to the eighth power polynomial equation:

$$S = {}^h[56(\theta/\beta)^5 - 140(\theta/\beta)^6 + 120(\theta/\beta)^7 - 35(\theta/\beta)^8]$$

The precise shape of curvature of the engagement surface is critical for a resettable torque limiter which is operated at relatively high speeds when in a released condition. While it has long been assumed by torque limiter designers that providing a smooth curvature of the engagement surface should suffice, resettable torque limiters have heretofore never been successfully able to operate at high speed in a released mode for extended periods.

Figure 5:
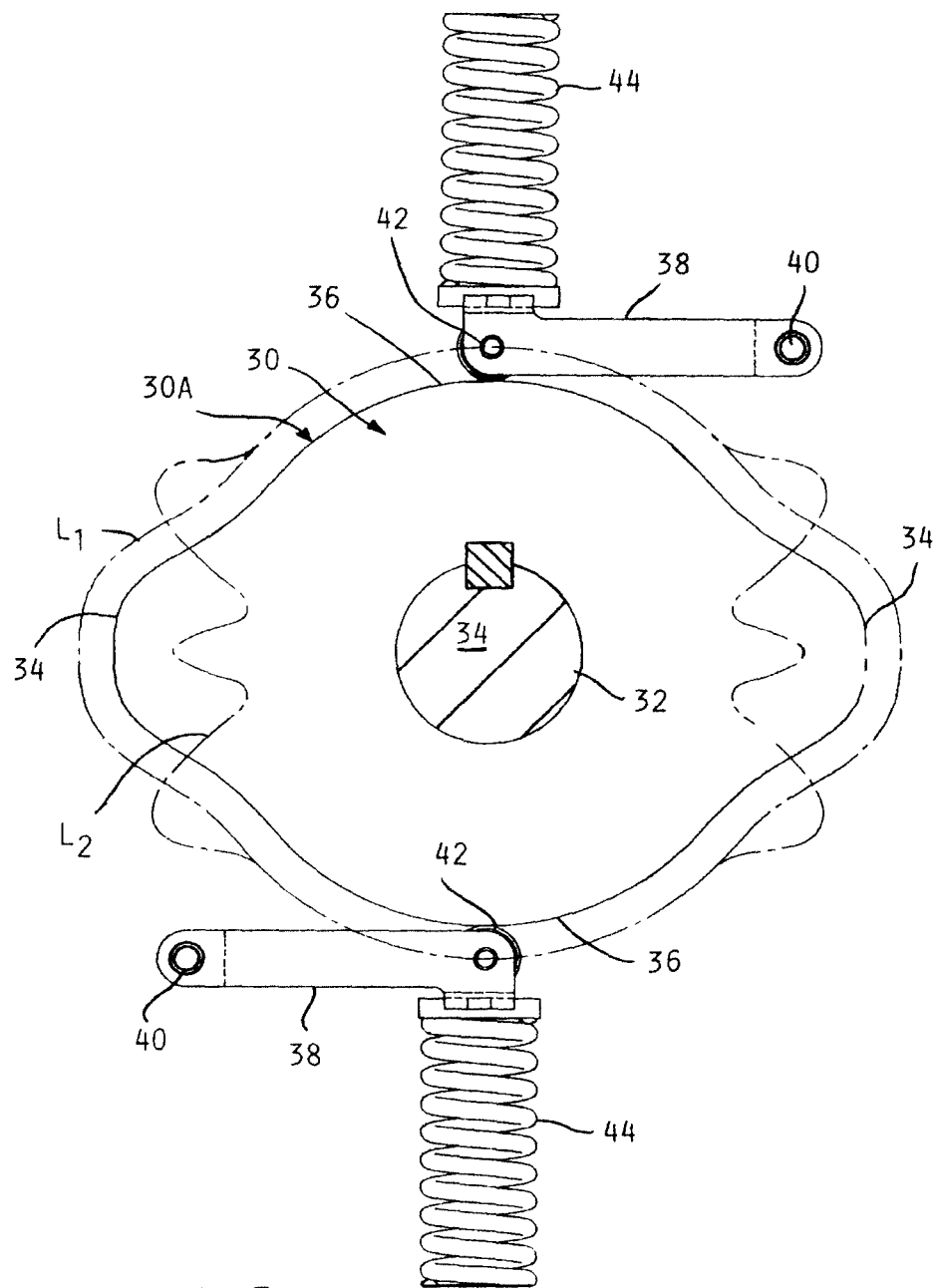
FIG. 5 is a diagram of a pair of engagement elements comprised of two rollers urged into contact with a two lobed engagement surface on a drive rotor with a plot in broken lines of the level of acceleration of the follower elements occurring as the rotor rotates through one complete rotation.

The reason is that simply providing a smooth curvature is not sufficient as there are dynamic effects which are not apparent. Referring to FIG. 5, the engagement surface 30A of a rotary drive member 30 driven by an input shaft 32 has two oppositely located lobes or undulations 34 extending out from a constant diameter peripheral engagement surface 36.

A pair of rocker arms 38 pivotally mounted at 40 supported respective engagement elements comprised of rollers 42 urged into engagement with the engagement surface 36 by associated springs 44.

The path traced by broken line L-1 represents the displacement of the center line of the rollers 42 as the member 30 rotates, reflecting the smooth curvature of the engagement surface 36.

However, the radial acceleration of the rollers 42, represented by broken line L-2 shows that acceleration of the rollers 42 sharply varies as the rollers 42 are displaced by the engagement surface 30A of the drive member 30.

Smooth appearing curves can produce dynamic loading by the theoretical development of infinite or near infinite accelerations and/or jerk at transition points on the engagement surface curvature.

A curvature which avoid such discontinuities is shaped as a plot of a polynomial function of at least the $5^{th}$ power, including the seventh power, but most preferred is the plot of an eighth power polynomial. FIG. 8A shows a plot of such an eighth power polynomial curve.

The points 1-7 correspond to:
1. Transition from Dwell to Rise
2. Maximum Acceleration
3. Maximum Negative Acceleration
4. Maximum Displacement
5. Maximum Negative Acceleration
6. Maximum Acceleration
7. Transition from Fall to Dwell These are repeated for travel over each lobe.

FIG. 8B is a plot of the first derivative (velocity) of the function of FIG. 8A.

$$dS/d\theta = V = {}^h/\beta [280(\theta/\beta)^4 - 840(\theta/\beta)^5 + 840(\theta/\beta)^7]$$

Where $\beta$ is the total angle of rise.
Points 1-7 correspond to:
1. Increase in Vertical Velocity 2. Rise-Maximum Increasing Velocity Slope
3. Rise Maximum Decreasing Velocity Slope
4. Zero Velocity
5. Fall-Maximum Increasing Velocity Slope
6. Fall Maximum Decreasing Velocity Slope
7. Back to Dwell Rest FIG. 8C is a plot of the second derivative (acceleration) of the function of FIG. 8A:

$$dV/d\theta = A = h/\beta^2[1120(\theta/\beta)^3 - 4200(\theta/\beta)^4 + 5040(\theta/\beta)^5 - 1960(\theta/\beta)^6]$$

It can be seen that while there are large changes in accelerations, there are no discontinuities or infinite values of accelerations.

FIG. 8D is a plot of the third derivative (jerk) of the function of FIG. 8A:

$$dA/d\theta = J = h/\beta^3[3360(\theta/\beta)^2 - 16800(\theta/\beta)^3 + 25200(\theta/\beta)^4 - 11760(\theta/\beta)^5]$$

It can be seen that again no discontinuities or very large or infinite values of jerk occur.

Thus, an engagement surface formed in conformity to a plot of an eight power polynomial function above will provide a torque limiter which can operate continuously in the released condition at high motor speeds without overstressing the parts leading to noise, and changing release torque levels, and complete failures.

Each particular application with a desired torque release set point and particulars as to the geometry of the various parts will reflect the actual dimensions of the curve of the engagement surface.

The invention claimed is:

1. A torque limiter arrangement for interrupting a rotary drive between two rotary members rotating at high speeds by disconnecting the two members to overrun relative each other at a speed on the order of 1800 rpm or higher for extended time periods after the torque transmitted between said members exceeds a predetermined level, comprising:
a curving engagement surface formed on one rotary member extending around an axis of rotation of said one member having a plurality of peaks each comprising a drive lobe;
a plurality of engagement element assemblies carried by another of said rotary members each including an engagement element spring urged into contact with said engagement surface by a spring arrangement acting radially on said engagement element, producing an increasing resistance force as said engagement element is caused to partially ascend a respective lobe by said relative rotation between said members caused by the transmission of torque therebetween over a preset limit, torque applied by one of said rotary members below said preset limit being insufficient to overcome said spring arrangement and not causing said engagement element to pass over said lobe and to thereby maintain a driving connection between said rotary members; and, wherein whenever a transmitted torque increases over said preset limit causing said one or more follower elements to be moved past and over said lobes whereby said rotary driving relationship between said rotary members is interrupted by said engagement elements passing over said one or more lobes to disconnect said driving relationship between said members until said applied torque again declines below said preset limit to reset said torque limiter by again preventing said engagement elements from rotating past an adjacent one or more lobe to thereby re-establish a rotary driving relationship between said rotary members, said lobes of said engagement surface of a curved shape insuring that discontinuities in a plot of the acceleration or jerk derivatives of the shape said lobes of said engagement surface do not occur anywhere along said plot as said engagement elements pass over said lobes, each of said engagement surface peaks being defined at least in part by curved shape of a plot of a polynomial function of at least the fifth power, thereby minimizing dynamic forces imposed on said engagement elements or engagement surface when said torque limiter is operating in a rotary member disconnected condition.

2. The torque limiter according to claim 1 wherein said engagement surface lobes are defined at least in part in accordance with the curved shape of a plot of an eighth power polynomial function.

3. A method of interrupting the transmission of torque between a pair of rotary drive members rotating at high speeds on the order of 1800 rpm or higher for extended periods comprising:
interconnecting said members by a plurality of engagement elements movably mounted on one of said members and applying an urging force tending to move said engagement elements into engagement with an engagement surface of revolution centered on an axis of rotation of said members formed on the other of said members,
said engagement surface formed with a series of curved lobes of increasing heights in the same direction as the direction of movement of said plurality of engagement elements which cause an increase in the urging force exerted on said engagement elements as said elements each ascend a respective one of said lobes to cause said elements to maintain a driving connection between said members as long as applied torque levels do not exceed a preset level necessary to overcome said urging force sufficiently to allow said engagement elements to completely ascend and pass by said lobes;
said transmission of torques interrupted when said applied torque levels exceed said preset levels, and configuring said engagement surface lobes to be shaped in accordance with a curved shape plot of a fifth or greater power polynomial function so as to not produce discontinuities in acceleration and/or jerk values when said lobes are overrun by said engagement elements.

4. The method according to claim 3 wherein said lobes are defined at least in part in accordance with the curved shape of a plot of a seventh or greater power polynomial function.

5. The method according to claim 4 wherein said lobes are defined at least in part by in accordance with the curved shape of a plot of an eighth power polynomial.

6. The method according to claim 3 including mounting said engagement rollers comprising said engagement elements on said one member so as to be urged to engage said engagement surface.

7. The method according to claim 3 further including mounting each of said rollers on a respective rocker arm which are pivoted on said one of said members.

* * * * *